3,330,869
VINYL POLYMERIZATION CATALYSTS
Rajendra N. Chadha, Adrian, Mich., assignor to Stauffer Chemical Company, Weston, Mich., a corporation of Delaware
No Drawing. Filed Apr. 2, 1964, Ser. No. 357,264
4 Claims. (Cl. 260—606.5)

This invention relates to a novel class of compounds which are useful as free radical initiators for the vinyl polymerization of such materials as acrylates, e.g., methylmethacrylate and acrylonitrile, styrene and vinyl acetate.

More specifically, this invention comprises compounds of the general formula $(R_4P)_2S_2O_8$ in which each R can be any monovalent hydrocarbon radical. For example, each R can be an alkyl radical such as methyl, ethyl, propyl, n-butyl, hexyl, octyl, octadecyl or myricyl radical; an alkenyl radical such as a vinyl, allyl or butadienyl radical; a cycloalkyl radical such as cyclopropyl, cyclobutyl or cyclohexyl radical; a cycloalkenyl radical such as a cyclopentenyl, cyclohexenyl, cyclopentadienyl or cyclohexadienyl radical; an aryl radical such as a phenyl, xenyl or naphthyl radical; an alkaryl radical such as a tolyl or dimethylphenyl radical or an aralkyl radical such as a benzyl, xylyl, phenylethyl, or p-vinylphenylethyl radical. Specific examples of the compounds of this invention include bis (tetramethyl phosphonium) persulfate, tetramethyl phosphonium tetraethyl phosphonium persulfate, bis (tetra-n-butyl phosphonium) persulfate, bis (tetra-octyl phosphonium) persulfate, bis (diethyldimethyl phosphonium) persulfate, bis (phenyltrimethyl phosphonium) persulfate, bis (cyclopentadienyltri-n-butyl phosphonium) persulfate, bis (butyltricyclohexyl phosphonium) persulfate, divinyl-di-n-butyl phosphonium tetra-n-butyl phosphonium persulfate, trivinyl-n-propyl phosphonium tetraethyl phosphonium persulfate and bis (vinyl-tri-n-butyl phosphonium) persulfate. It is preferable that R is limited to nonaromatic, i.e., aliphatic and cycloaliphatic, radicals of no more than about 12 carbon atoms and, more preferably, to alkyl radicals.

The compounds of this invention are prepared by reacting the respective quaternary phosphonium hydroxides with ammonium persulfate, also known as ammonium peroxydisulfate, in aqueous solution. The quaternary phosponium hydroxides can be the same or a mixture of different hydroxides can be employed. They are prepared, for example, by the Grignard synthesis shown in U.S. Patent No. 2,883,366. They decompose on heating above about 130° C. whereas ammonium peroxydisulfate decomposes at about 120° C. Reacting the respective quaternary phosphonium hydroxides and the ammonium persulfate in an aqueous medium thus protects the reactants from heat decomposition. If the R radicals in the quaternary phosphonium hydroxides are such as to make the hydroxides reasonably water soluble, the desired reaction takes place at room temperature with the product crystallizing out of the aqueous system. If the R radicals are such as to render the hydroxides insoluble in water at room temperature, it may be necessary to heat the system to temperatures, even up to reflux, to effect reaction at reasonable rates. Alternatively, any common solvent for the reactants can be used since the persulfate products are essentially insoluble in normal solvents. In any case, the desired product crystallizes out. Care must be taken where heat is applied to the system that the temperature is below the decomposition temperature of the product. The critical maximum temperature for each system can be readily determined by the presence or absence of crystallizing product.

The preparation of a typical composition of this invention is set forth below.

Example 1

Tetra-n-butyl phosphonium hydroxide and ammonium persulfate were mixed in aqueous solutions in a molar ratio of 2:1 at room temperature. A 97% yield of bis (tetra-n-butyl phosphonium) persulfate crystallized out. The product was washed, dried and found to melt at 86° C.

Example 2

When each of the following hydroxides is substituted for the tetra-n-butyl phosphonium hydroxide in Example 1, the corresponding bis-phosphonium persulfate is produced.

tetramethyl phosphonium hydroxide
diethyldimethyl phosphonium hydroxide
vinyltri-n-butyl phosphonium hydroxide The persulfates of this invention are useful in concentrations of from 0.01 to about 10% by weight as vinyl polymerization catalysts as shown by the following examples. Examples of suitable monomers which can be polymerized using the persulfate catalysts of this invention include vinyl acetate, acrylonitrile, acryloxytriacetoxysilane, styrene and methylmethacrylate.

Example 3

Separate portions of bis (tetra-n-butyl phosphonium) persulfate were mixed under nitrogen with vinyl acetate and acrylonitrile in amounts equal to 0.05% by weight based on the weight of resin monomer. The vinyl acetate polymerized at 65° C. to a hard polymer; a similar control sample without the persulfate failed to polymerize after heating at 70° C. for 5½ hours. The acrylonitrile polymerized at 50° C.

When these runs are repeated using the persulfates produced in Example 2 as catalysts, the results are the same.

Thus having described my invention, I claim:

1. A compound of the formula $(R_4P)_2S_2O_8$ in which each R is a monovalent hydrocarbon radical.
2. A compound of the formula $(R_4P)_2S_2O_8$ in which each R is a nonaromatic monovalent hydrocarbon radical of no more than about 12 carbon atoms.
3. The method comprising (1) mixing in a common solvent (A) a compound of the formula $R_4POH$ in which each R is a monovalent hydrocarbon radical and (B) ammonium persulfate and (2) heating the mixture at a temperature sufficient to produce a compound of the general formula $(R_4P)_2S_2O_8$ in which each R is as defined above.
4. Bis (tetra-n-butyl phosphonium) persulfate.

References Cited

UNITED STATES PATENTS

| | | | |
|---|---|---|---|
| 3,013,085 | 12/1961 | Buckler | 260—606.5 |
| 3,027,359 | 3/1962 | Jurgeleit | 260—88.7 |
| 3,047,553 | 7/1962 | Coffman | 260—88.7 |
| 3,098,878 | 7/1963 | Harris et al. | 260—606.5 |

HELEN M. McCARTHY, *Primary Examiner.*

JOSEPH L. SCHOFER, TOBIAS E. LEVOW,
*Examiners.*

H. WONG, W. F. BELLAMY, *Assistant Examiners.*